United States Patent [19]
Stiller et al.

[11] Patent Number: 6,055,864
[45] Date of Patent: May 2, 2000

[54] PRESSURE SENSOR AND METHOD FOR ITS PRODUCTION

[75] Inventors: Rudolf Stiller, Niederdorfelden; Norbert Schmidt, Eppstein; Ivan Grgec-Messner, Kelkheim; Klaus-Dieter Meese, Frankfurt, all of Germany

[73] Assignee: Mannesmann VDO AG, Frankfurt am Main, Germany

[21] Appl. No.: 09/285,542

[22] Filed: Apr. 2, 1999

[30] Foreign Application Priority Data

Apr. 14, 1998 [DE] Germany ............................ 198 16 521
Oct. 6, 1998 [DE] Germany ............................ 198 25 889

[51] Int. Cl.[7] ................................ G01L 9/12; G01L 7/00; G01D 21/00
[52] U.S. Cl. ................................ 73/724; 73/756; 73/718; 73/866.5
[58] Field of Search ..................... 73/715, 756, 716–754, 73/866.5, 700

[56] References Cited

U.S. PATENT DOCUMENTS

| | | |
|---|---|---|
| 5,043,841 | 8/1991 | Bishop et al. ......................... 361/283 |
| 5,343,757 | 9/1994 | Tate ........................................... 73/724 |
| 5,822,173 | 10/1998 | Dague et al. ......................... 361/283.3 |
| 5,827,972 | 10/1998 | Balcarek et al. ......................... 73/756 |

FOREIGN PATENT DOCUMENTS

| | | |
|---|---|---|
| 0651240A1 | 10/1994 | European Pat. Off. . |
| 0723143A1 | 1/1995 | European Pat. Off. . |
| 09218123 | 2/1996 | Japan . |

*Primary Examiner*—Benjamin R. Fuller
*Assistant Examiner*—Abdullahi Aw-Musse
*Attorney, Agent, or Firm*—Richard A. Speer; Mayer Brown & Platt

[57] ABSTRACT

In the case of a pressure sensor (1) a measuring cell (4) is fixed together with a retaining body (9) in a housing (2) of the pressure sensor. For this purpose, the housing (2) has a constriction (15) encircling it on the outside. A contact base (11), which is placed at the top onto the retaining body (9), is fixed by means of an inwardly bent section (18) of the housing (2), with the result that the pressure sensor (1) is closed in a sealed manner. The fixing of the retaining body (9) by means of the constriction (15) means that the pressure sensor (1) is also suitable for particularly high pressures with the risk that the retaining body (9) could slip in the housing (2) due to the pressure acting on the measuring cell (4) being excluded.

5 Claims, 3 Drawing Sheets

PRESSURE SENSOR AND METHOD FOR ITS PRODUCTION

BACKGROUND

The invention relates to a pressure sensor having a housing which has a measuring space, having a measuring cell which is supported in the housing by means of a retaining body and bounds the measuring space, and having an electric contact base which is connected to the measuring cell, the measuring space being able to be subjected to pressure via an opening in the housing. The invention furthermore relates to a method for producing a pressure sensor of this type.

To measure the pressure of gases or liquids, the pressure sensor is inserted in a sealing manner into a container holding a gas or a liquid. For this purpose, known pressure sensors have, for example, a connecting piece which is provided with an external thread and by means of which the pressure sensor can be screwed into the container. This connecting piece furthermore has an opening which is designed as a hole and through which the medium which is to be measured passes into a measuring space closed by means of the measuring cell. The measuring cell is supported for this purpose in the housing by means of a retaining body and is sealed from the medium to be measured by a sealing ring. The pressure sensor is contacted via a contact base which is placed onto the retaining body. The contact base protects the contact elements arranged in the interior by means of its sealed connection to the housing, with the result that the pressure sensor, together with its mounting parts, forms a hermetically sealed unit.

Depending on the intended use, the pressure sensor provided in this manner also has to withstand a high pressure. Therefore, according to a known production method, the retaining body, which fixes the measuring cell, is pressed into the housing. The contact base, which consists of an electrically insulating material, generally plastic, is then likewise pressed into the housing and thus encloses the measuring cell in the interior of the housing. For the electrical contact-making, the contact base has contact pins which protrude into the interior of the pressure sensor and are connected to the measuring cell.

In a known embodiment, following the installation, the measuring cell is calibrated. Of disadvantage in this case is that the pressure sensor is inaccurate, the inaccuracy arising over time and resulting from a change in the mechanical clamping ratios. In addition, the outlay on installation of the pressure sensor is high which in particular also makes automation of the installation more difficult.

In another known embodiment, after the retaining body which fixes the measuring cell has been pressed in, the measuring cell is set to the desired values. The contact base is then placed on and likewise pressed in. Of disadvantage in this case is the fact that the subsequent pressing-in of the contact base enables deviations from the desired value set to arise once again.

Furthermore, in the case of both embodiments described, it is disadvantgeous that ageing processes can occur, in particular in the plastic material generally used for the contact base, but also in the retaining body, which ageing processes can lead to a relaxing of the pressing-in force and hence to inaccuracies in the determined measured values. Likewise, differing thermal expansions of the various components influence the measuring accuracy.

In addition, the case of pressure sensors subjected to particularly high stress, axial displacement of the retaining body and the measuring cell supported by said body can occur in the housing. The durably constant measuring accuracy of the measuring cell can therefore be achieved only with a considerable additional outlay.

DESCRIPTION OF THE INVENTION

The invention is based on the problem of designing a pressure sensor of the type mentioned at the beginning in such a manner that the measuring cell can be calibrated in the production process and, at the same time, a high measuring accuracy can be achieved over the entire service life. Furthermore, the intention is to provide a method for producing a pressure sensor of this type.

According to the invention, the problem mentioned first is achieved in that the retaining body is fixed in the housing by means of a form-fitting connection. By this means, it is possible first to insert the measuring cell together with the retaining body into the housing and to fix them by means of the form-fitting connection. The measuring cell can then be calibrated without the measuring cell being affected by the contact base being placed on. In particular, the measuring cell then also remains in its predetermined position when the contact base is placed onto the retaining body and fixed, since because of the form-fitting connection an axial displacement of the retaining body which fixes the measuring cell is ruled out. Furthermore, the fixing by means of the form-fitting connection requires only a low outlay, as a result of which the production costs can be reduced. At the same time, the pressing-in of the retaining body into the housing, which is required according to the prior art, is dispensed with, with the result that it is possible, according to the invention, also to use materials which can be less highly stressed for the housing.

The form-fitting connection could be achieved by latching or screwing the retaining body in place. However, a particularly advantageous development of the invention is provided by the fact that the form-fitting connection has a constriction arranged in the housing. The constriction requires only slight structural changes to the pressure sensor housing which is known per se. Essentially, all that is needed is a clearance on the inside permitting the housing to be constricted. The constriction can transmit considerable forces and forms a defined, upper stop for the retaining body. At the same time, the retaining body is centered in the housing by means of the constriction so that it is unable to become tilted or jammed. Moreover, the constriction can at the same time also serve as a stop for the contact base so that a compressive force introduced via the contact base is not transmitted to the retaining body.

Another particularly favourable development of the invention is also provided by the fact that the retaining body is inserted at a distance from the housing. For satisfactory functioning of the measuring cell, it is necessary for the latter initially to be inserted in a tension-free manner into its predetermined position and then to be fixed as evenly as possible by means of the retaining body. The distance between the housing and the retaining body enables the latter initially to be optimally positioned and subsequently fixed. Jamming, which can hardly be perceived from the outside, or fixing of the retaining body in another position than the one provided, can therefore effectively be prevented. Possible deviations in the measuring accuracy from its desired value by the thus provided pressure sensor can be avoided by this means.

A development of the invention is particularly favourable here if the retaining body has a stop for limiting the force which can be transmitted to the measuring cell. In this case, the form-fitting connection causes the measuring cell initially to be placed against an elastic sealing ring so that the pressure sensor is closed in a pressure-tight manner with respect to the medium to be measured. The seal is merely compressed here sufficiently far for the stop of the retaining body to bear against the housing. Damage to the measuring cell on account of an excessive compressive force applied to the retaining body in the axial direction of the pressure sensor can thereby be avoided.

A solution to the second problem mentioned of providing a method for the production of a pressure sensor, in which a measuring cell is inserted together with a retaining body and a contact base into a housing of the pressure sensor and is subsequently retained therein by deformation of the housing, is achieved according to the invention in that the measuring cell and the retaining body are inserted into the housing, the retaining body is then fixed in the housing in a form-fitting manner and the contact base is connected to the housing. By this means, the measuring cell and the retaining body which fixes the measuring cell can be arranged in the housing in such a manner that a pressing-in force, which worsens the measuring accuracy of the measuring cell, is not transmitted to the measuring cell. In the same manner, axial displacement of the retaining body by relaxing the pressing-in force and a worsening of the measuring accuracy associated therewith are prevented.

A particularly simple design of the method can be achieved if after the retaining body has been inserted into the housing, a constriction is made on the circumference of the housing, with the result that the retaining body is fixed in the housing. The retaining body is thereby fixed both axially and radially in the housing. At the same time, the constriction can be made relatively simply, it also being suitable for high measuring pressures.

DESCRIPTION OF THE DRAWINGS

The invention permits various embodiments. To further clarify its basic principle, one of these is illustrated in the drawing and is described below. In the drawing.

DESCRIPTION OF THE PREFERRED EMBODIMENTS

Figure 1:
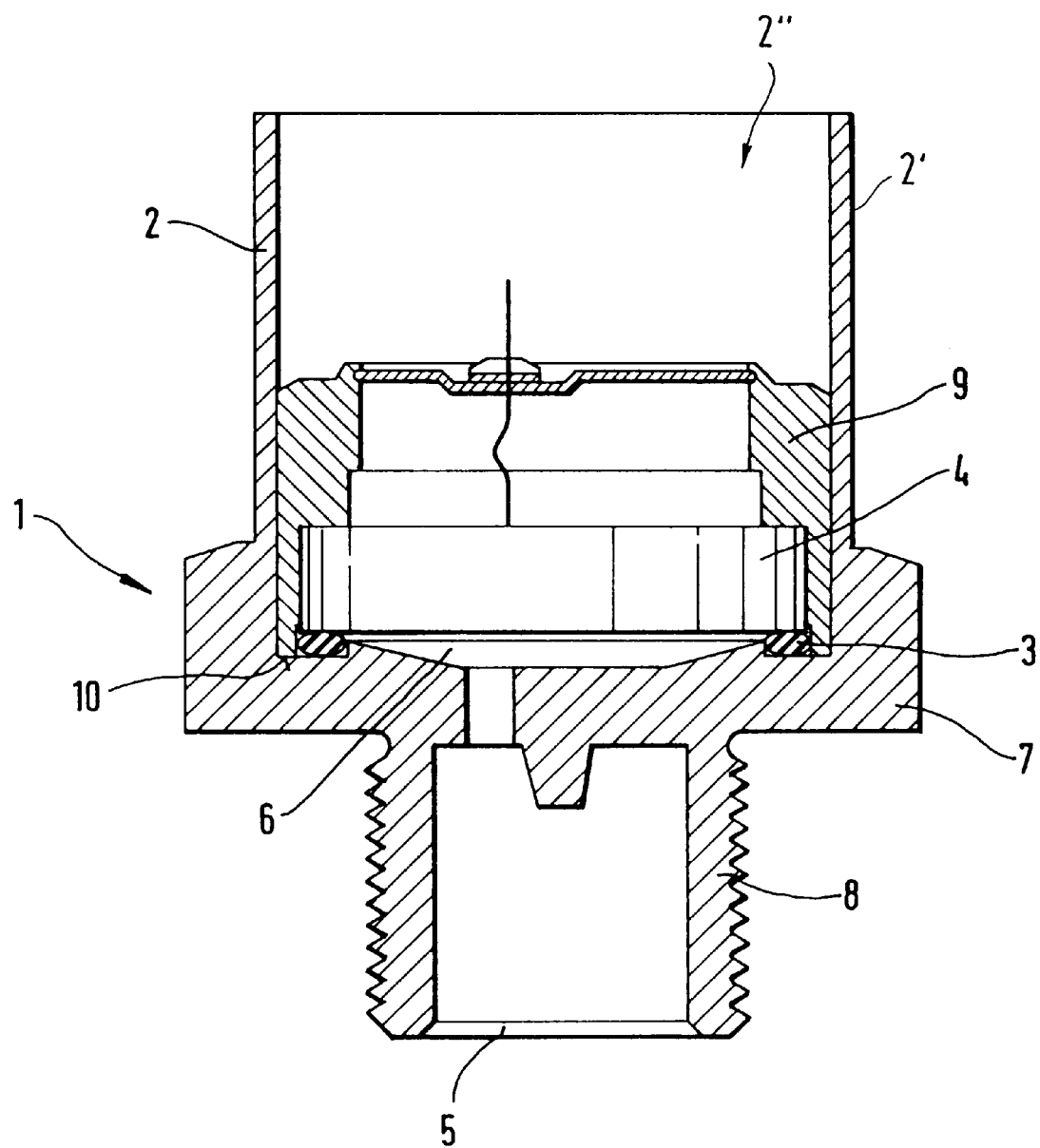
FIG. 1 shows a vertical section through a housing of a pressure sensor according to the invention having a retaining body inserted therein and a measuring cell.
Figure 3:
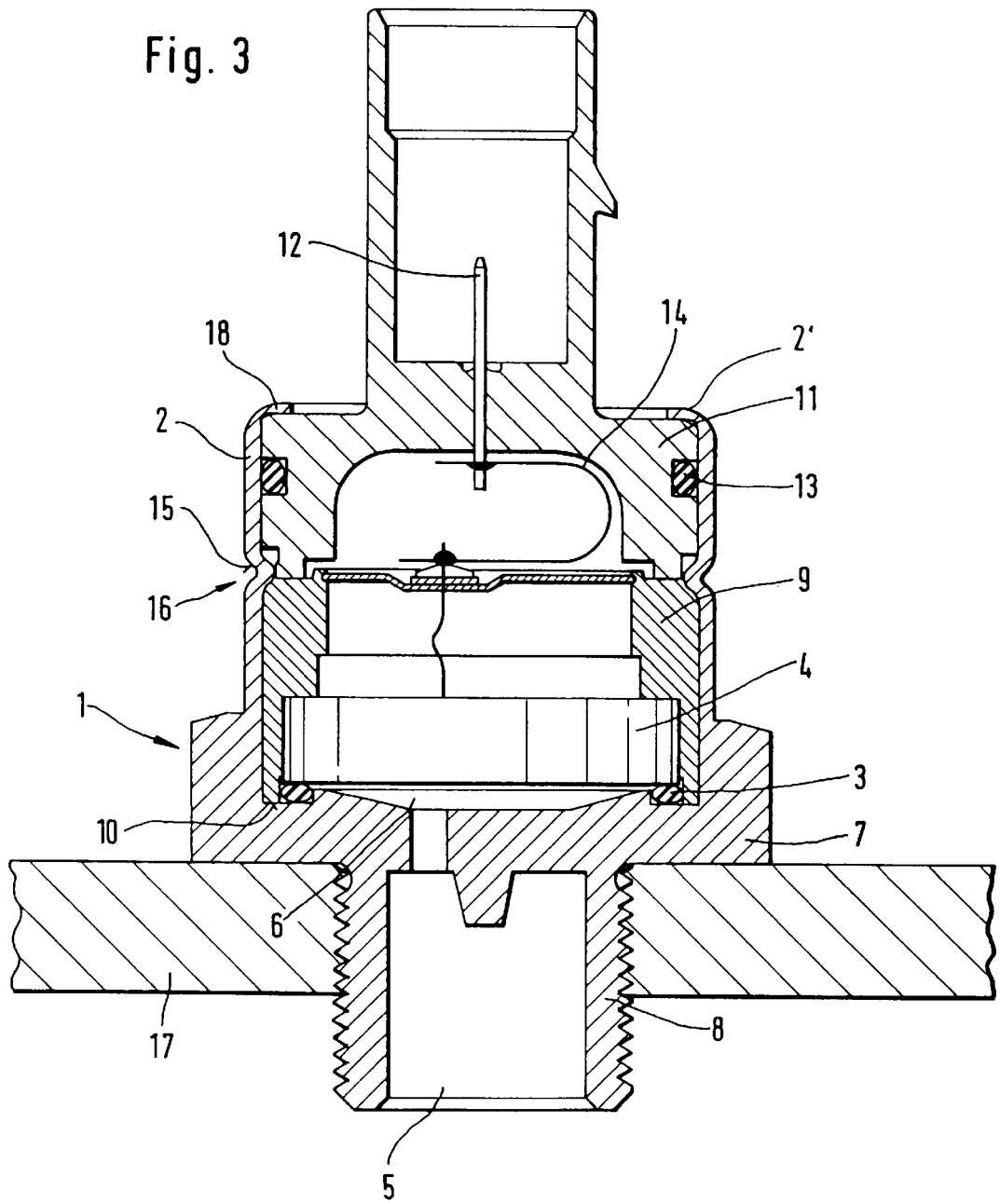
FIG. 3 shows the fully fitted pressure sensor in an installed position.

FIG. 1 shows a pressure sensor 1 according to the invention in a vertical sectional illustration. The pressure sensor 1, which has a housing 2 made of metal (for example, brass), has a measuring cell 4 which bears against a sealing ring 3. Together with the housing 2, this measuring cell 4 forms a measuring space 6 which is subjected to the pressure to be measured from below through an opening 5 in the housing 2. For this purpose, the pressure sensor 1 bears, by means of a section of the housing 2 designed as a connection piece 7, against a container (not shown) so that a connecting stub 8 of the pressure sensor 1 protrudes into the medium to be measured. The end of housing 2 opposite the connecting stub 8, the upper end, as viewed in FIG. 3, is comprised of an extended wall portion 2' that defines an essentially cylindrical cavity 2". The measuring cell 4 is positioned within cavity 2" on sealing ring 3 and the remaining pressure responsive functional parts of sensor 1 are subsequently inserted into the cavity 2", as explained below. It is to be noted that in the initial stages of construction, as shown in FIG. 1, the diameter of cylindrical cavity 2" is the same throughout extended wall portion 2', in order that the pressure responsive functional parts of sensor 1, specifically retaining body 9, measuring cell 4 and electric base contact 11 can all be inserted easily into cavity 2". The measuring cell 4, which operates, for example, according to the capacitive measuring principle, is retained in its position by means of a retaining body 9, which can be inserted from above into the housing 2, and is supported axially. In this case, the maximum axial contact pressure force which can be transmitted to the measuring cell 4 by means of the retaining body 9 is limited by means of a lower section of the retaining body 9, which lower section is designed as a stop 10. The stop 10 therefore bears against the housing 2 when the sealing ring 3 is compressed to a predetermined extent. The compression of the sealing ring 3, which compression is defined in accordance with the distance of the end of the stop 10 from that flank of the measuring cell 4 which is on the measuring space side, is a measure for the axial contact pressure force of the measuring cell 4.

Figure 2:
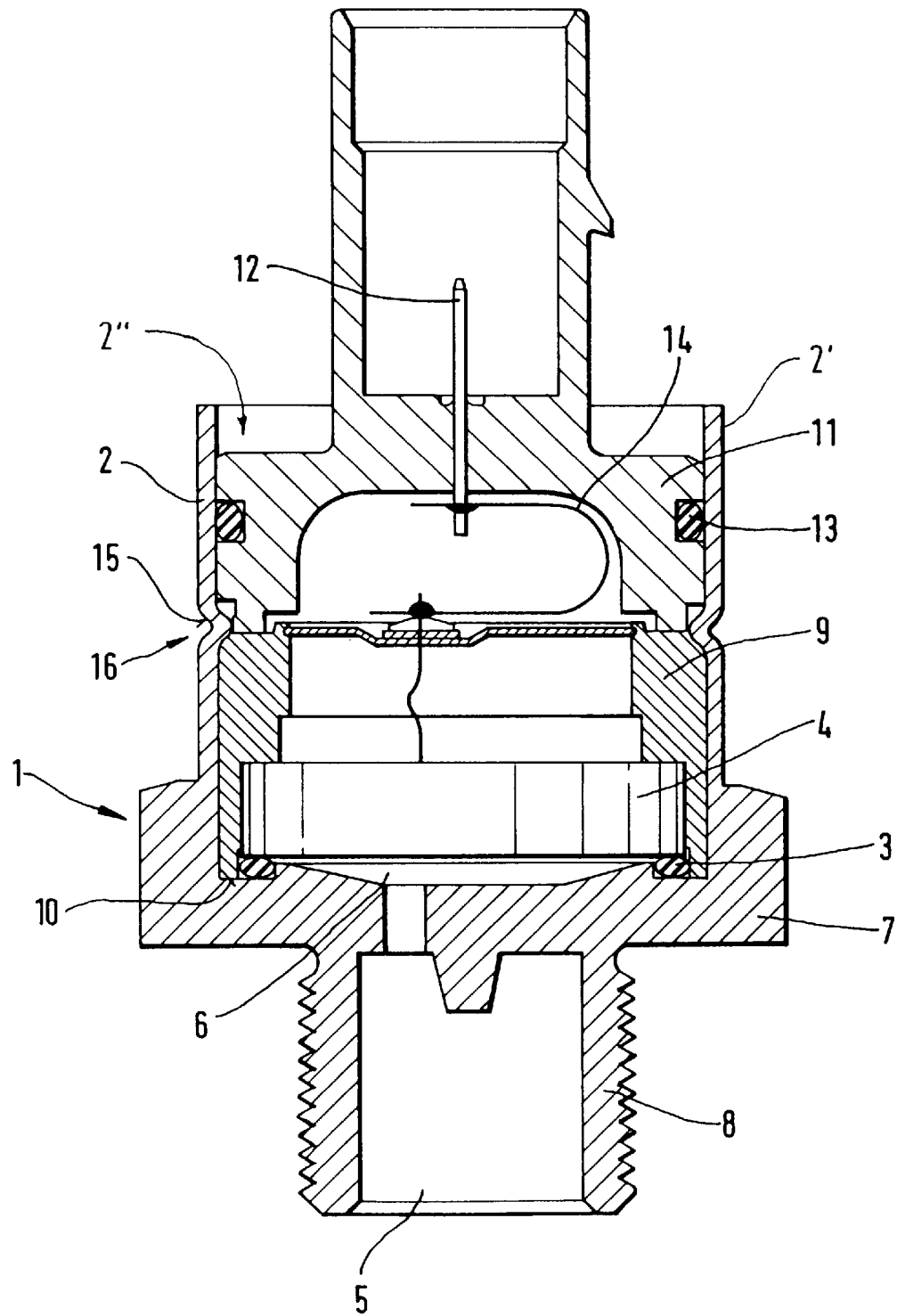
FIG. 2 shows the housing having the retaining body fixed therein and a contact base additionally inserted therein.

FIG. 2 shows, in a vertical sectional illustration, the pressure sensor 1 in an advanced installation state, in which in addition to the measuring cell 4 and the retaining body 9 an electric contact base 11 is inserted into the housing 2. The contact base 11, which is provided with a plug-in contact 12, is sealed on the outside with respect to the housing 2 by means of a sealing ring 13 and has an electric contact element 14 which is connected to the measuring cell 4. In the illustrated state, the retaining body 9 is fixed in the housing 2 by means of a form-fitting connection 16 which has a first constriction section 15 in extended wall portion 2'. The retaining body 9 is thereby secured both in its axial position and in its radial position, with the result that the measuring cell 4, which is sealed by means of the sealing ring 3, also withstands media flowing at high pressure into the measuring space 6 through the opening 5 in the connecting stub 8.

FIG. 3 shows, in a vertical sectional illustration, the fully fitted pressure sensor 1 in an installed position. The pressure sensor 1 is screwed into a container wall 17 by means of a thread arranged on the outside of the connection stub 8. In this case, the pressure sensor 1 bears with its connecting piece 7 against the container wall 17 (shown only in sections), with the result that the connecting stub protrudes into a pressurized medium (not shown). The medium to be measured can therefore flow through the opening 5 into a measuring space 6 which is bounded by the measuring cell 4 which bears against the sealing ring 3. The measuring cell 4 is fixed here by means of the retaining body 9, which is fixed by means of the constriction 15, and the contact base 11 placed on said body. The contact base 11 is sealed off from the housing 2 by means of the sealing ring 13 and is fixed in its position by means of a second constricted section 18 of the housing 2, which section is bent towards the center of the housing. The pressure sensor 1 can make contact with further electric connecting elements (not shown) by means of the plug-in contact 12.

What is claimed is:

1. A pressure sensor comprising:

(a) a housing including an extended wall portion defining a substantially cylindrical cavity;

(b) a measuring cell supported within the cavity;

(c) a measuring cell retaining body (9) disposed within the cavity, the retaining body being configured to radially and axially support the cell within the cavity and define with said cell in measuring space;

(d) an electric contact base (11) which is electrically connected to the measuring cell disposed within the cavity in contact with the retaining body; and (e) a constricted section (15) in the extended wall portion of the housing at a location fixing the retainer body in position and a bent region in the extended wall portion at a location fixing the contact base in position.

2. The pressure sensor as claimed in claim 1 wherein the constricted section (15) fixing the retaining body (9) in position is an inwardly extending portion of the extending wall portion (2').

3. The pressure sensor as defined in claim 1 wherein the second constricted section 18 is an inwardly extending portion located to hold contact base (11) in fixed position.

4. The pressure sensor as claimed in claim 1 or 3, wherein the retaining body (9) is inserted at a distance from the housing (2).

5. The pressure sensor as claimed in claim 1 or 3 wherein the retaining body (9) has a stop (10) for limiting the force which can be transmitted to the measuring cell (4).

* * * * *

UNITED STATES PATENT AND TRADEMARK OFFICE
CERTIFICATE OF CORRECTION

PATENT NO.    : 6,055,864
DATED         : May 2, 2000
INVENTOR(S)   : Rudolf Stiller et al.

It is certified that error appears in the above-identified patent and that said Letters Patent is hereby corrected as shown below:

<u>Title page,</u>
Item [30], substitute
"June 10, 1998 [DE] Germany ........................... 198 25 889"
for -- October 6, 1998 [DE] Germany .................... 198 25 889 --.

Signed and Sealed this

Twenty-seventh Day of January, 2004

JON W. DUDAS
*Acting Director of the United States Patent and Trademark Office*